(12) United States Patent
Wu et al.

(10) Patent No.: US 7,035,498 B2
(45) Date of Patent: Apr. 25, 2006

(54) ULTRA-FAST ALL-OPTICAL SWITCH ARRAY

(75) Inventors: Pingfan Peter Wu, Niskayuna, NY (US); George Theodore Dalakos, Niskayuna, NY (US); Peter William Lorraine, Niskayuna, NY (US); Brian Lee Lawrence, Clifton Park, NY (US)

(73) Assignee: General Electric Company, Niskayuna, NY (US)

( * ) Notice: Subject to any disclaimer, the term of this patent is extended or adjusted under 35 U.S.C. 154(b) by 0 days.

(21) Appl. No.: 10/951,346

(22) Filed: Sep. 28, 2004

(65) Prior Publication Data

US 2006/0067610 A1    Mar. 30, 2006

(51) Int. Cl.
*G02B 6/26* (2006.01)
*G02B 6/42* (2006.01)

(52) U.S. Cl. .......................... 385/16; 385/15; 385/17; 385/18; 385/20; 385/24; 385/31; 385/39; 385/47; 385/50

(58) Field of Classification Search ............ 385/14–25, 385/31, 33, 39, 47, 51; 398/43, 45–57, 66–68, 398/79, 91–92, 140–157; 359/196–201, 359/204–205, 209–217, 244–245, 223–227, 359/234, 262, 515, 520, 293, 321, 885
See application file for complete search history.

(56) References Cited

U.S. PATENT DOCUMENTS

| | | | | |
|---|---|---|---|---|
| 4,283,113 A | * | 8/1981 | Eden | .......................... 385/18 |
| 5,608,568 A | * | 3/1997 | Blodgett et al. | ............. 359/288 |
| 5,732,168 A | * | 3/1998 | Donald | ........................ 385/16 |
| 5,757,525 A | * | 5/1998 | Rao et al. | .................... 359/108 |
| 5,847,815 A | * | 12/1998 | Albouy et al. | ............. 356/4.01 |
| 6,172,795 B1 | * | 1/2001 | Carlson | ...................... 359/290 |
| 6,381,059 B1 | * | 4/2002 | Carlson | ...................... 359/244 |

(Continued)

OTHER PUBLICATIONS

Perazzo et al.; "Infrared vision using uncooled mircro-optomechanical camera"; Appl. Phys. Lett., vol. 74, No. 23, Jun. 7, 1999; p.p. 3567-3569.

Lopez, Haynes, Boatner, Feldman, and Haglund; "Temperature-controlled surface plasmon resonance in $VO_2$ nanorods"; Aug. 1, 2002 / vol. 27, No. 15 / Optics Letters; p.p. 1327-1329.

(Continued)

*Primary Examiner*—Frank G. Font
*Assistant Examiner*—Ryan Lepisto
(74) *Attorney, Agent, or Firm*—Fletcher Yoder

(57) ABSTRACT

An all-optical switching array for switching a direction of optical signals is presented. The all-optical switching array includes a first substrate. Furthermore, the all-optical switching array includes a plurality of optical switches disposed on the first substrate, wherein each of the plurality of optical switches comprises a first state and a second state and is configured to change the direction of an optical signal, depending on whether the optical switch is in the first state or the second state. The transition of the switch between the first state and the second state is triggered by an ultra-fast laser beam.

25 Claims, 5 Drawing Sheets

U.S. PATENT DOCUMENTS

| | | | |
|---|---|---|---|
| 6,480,309 B1* | 11/2002 | Lee et al. | 398/45 |
| 6,583,916 B1* | 6/2003 | Carlson et al. | 359/244 |
| 6,724,512 B1* | 4/2004 | Carlson et al. | 359/244 |
| 6,757,094 B1* | 6/2004 | Carlson et al. | 359/299 |
| 6,768,572 B1* | 7/2004 | Romanovsky | 359/245 |
| 6,816,296 B1* | 11/2004 | Romanovsky | 359/245 |
| 2001/0038732 A1* | 11/2001 | Carlson | 385/19 |
| 2002/0141029 A1* | 10/2002 | Carlson et al. | 359/244 |
| 2003/0133174 A1* | 7/2003 | Salehi et al. | 359/15 |

OTHER PUBLICATIONS

Lopez, Haynes, Boatner, Feldman, and Haglund; "Size effects in the structural phase transition of $VO_2$ nanoparticles"; Physical Review B, vol. 65, 224113; p.p. 1-5.

F.J.Morin; "Oxides Which Show a Metal-To-Insulator Transition at the Neel Temperature"; Physical Review letters vol. 3, No.-1; Jul. 1, 1959; p.p. 34-36.

* cited by examiner

ULTRA-FAST ALL-OPTICAL SWITCH ARRAY

BACKGROUND

The invention relates generally to a communication network, and more specifically to an all-optical communication network.

A revolution in telecommunication networks that began in the early 1980s and was spawned by the use of a fiber-optic cable witnessed the widespread growth of the Internet and modern communication systems. As the Internet became increasingly prevalent, the growth of data traffic has resulted in a growing demand for increased network capacity in the optical telecommunication networks. In order to meet this demand, numerous advances in the technologies associated with the optical networks have facilitated tremendous cost savings and enhanced network quality.

Typically, the switching process employed in the optical telecommunication networks involves converting an optical signal to an electrical signal, logically switching using the electrical signal and then converting the electrical signal back to the optical signal for further propagation. As a consequence of the intervening electronics, there is a significant loss of bandwidth that may have a significant negative impact on the quality of transmission, and ultimately on the quality of service (QOS).

Various techniques have been developed to reduce the loss of bandwidth. For example, several technologies, such as, thermo-optic switches, acousto-optic switches, and electro-optic switches have been employed to address the fast switching needs of the optical communication networks. Further, microelectrical mechanical systems (MEMS) have been employed to facilitate the switching of the optical signals. However, the mirror switching in the MEMS device is controlled by an electrical signal. It also suffers from high transmission losses due to the small size and low reflectivity of the mirror. Furthermore, crosstalk between channels may also adversely affect quality of transmission. Finally, mechanical and electromechanical systems may also suffer from slower switching speeds.

It would be desirable to circumvent the loss of bandwidth associated with switching electronics in the optical telecommunication network to enhance the quality of the network. In addition, it may be desirable to achieve improvements in switching times associated with the network. Further, it may be desirable to circumvent the disadvantages encountered by the current telecommunication networks by developing an all-optical network, wherein the communication remains in the optical domain throughout the entire transmission time.

BRIEF DESCRIPTION

Briefly in accordance with one embodiment of the present technique, an all-optical switching array for switching a direction of optical signals is presented. The all-optical switching array includes a first substrate. Furthermore, the all-optical switching array includes a plurality of optical switches disposed on the first substrate, wherein each of the plurality of optical switches comprises a first state and a second state and is configured to change the direction of an optical signal, depending on whether the optical switch is in the first state or the second state.

According to another aspect of the present technique, an alternate embodiment of an all-optical switching array for switching a direction of optical signals is presented. The all-optical switch array includes a first substrate. Further, the all-optical switch array includes a second substrate disposed on the first substrate and having a layer of a thermochromic material disposed thereon.

In accordance with aspects of the present technique, a method of operating an all-optical network is presented. The method includes transmitting an incident optical signal via an optical input to a first target through a first optical switch, wherein first optical switch comprises a first state and a second state and is configured to change the direction of an optical signal, depending on whether the first optical switch is in the first state or the second state. Furthermore, the method includes directing a control beam at the first optical switch such that the control beam optically triggers the first optical switch to switch between the first state and the second state. In addition, the method includes receiving the optical signal at a second target.

In accordance with further aspects of the present technique, an optical network system is presented. The system includes a plurality of transmitters, wherein the transmitters are configured to transmit an optical signal. Additionally, the system includes a multiplexer unit configured to combine the optical signals. Also, the system includes a conditioning unit configured to balance or compensate non-uniformities among the optical signals. Furthermore, the system includes one or more amplifier units configured to enhance the optical signals. In addition, the system includes a wavelength management unit configured to monitor the performance of optical signals. Additionally, the system includes a switch array configured to switch a direction of an optical signal from an optical input to an optical output, wherein the switch array comprises a plurality of optical switches, wherein each of the plurality of optical switches comprises a first state and a second state and is configured to change the direction of the optical signal, depending on whether the optical switch is in a first state or a second state. Further, the system includes a demultiplexer configured to separate the transmitted optical signals. In addition, the system includes a plurality of receivers configured to receive the transmitted signals.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

The demand for Internet services is driving the growth of data traffic, which has resulted in use of applications that devour greater bandwidth in order to facilitate the fast delivery of information. Generally, the current telecommunication infrastructure includes fiber optic cables in the long-haul backbone networks, some fiber and copper wire in the regional networks, and primarily copper wire for access networks and connections to the end users. However, the current telecommunication infrastructure involves converting an optical signal to an electrical signal, logically switching using the electrical logical switching and then converting the electrical signal back to the optical signal for propagation. The intervening electronics may subsequently limit the overall transmission bandwidth resulting in inferior quality of transmission. It may be desirable to circumvent the disadvantages encountered by the current telecommunication networks by developing an all-optical network, where all the communication remains in the optical domain throughout the entire transmission time. The techniques discussed herein address some or all of these issues.

Figure 1:
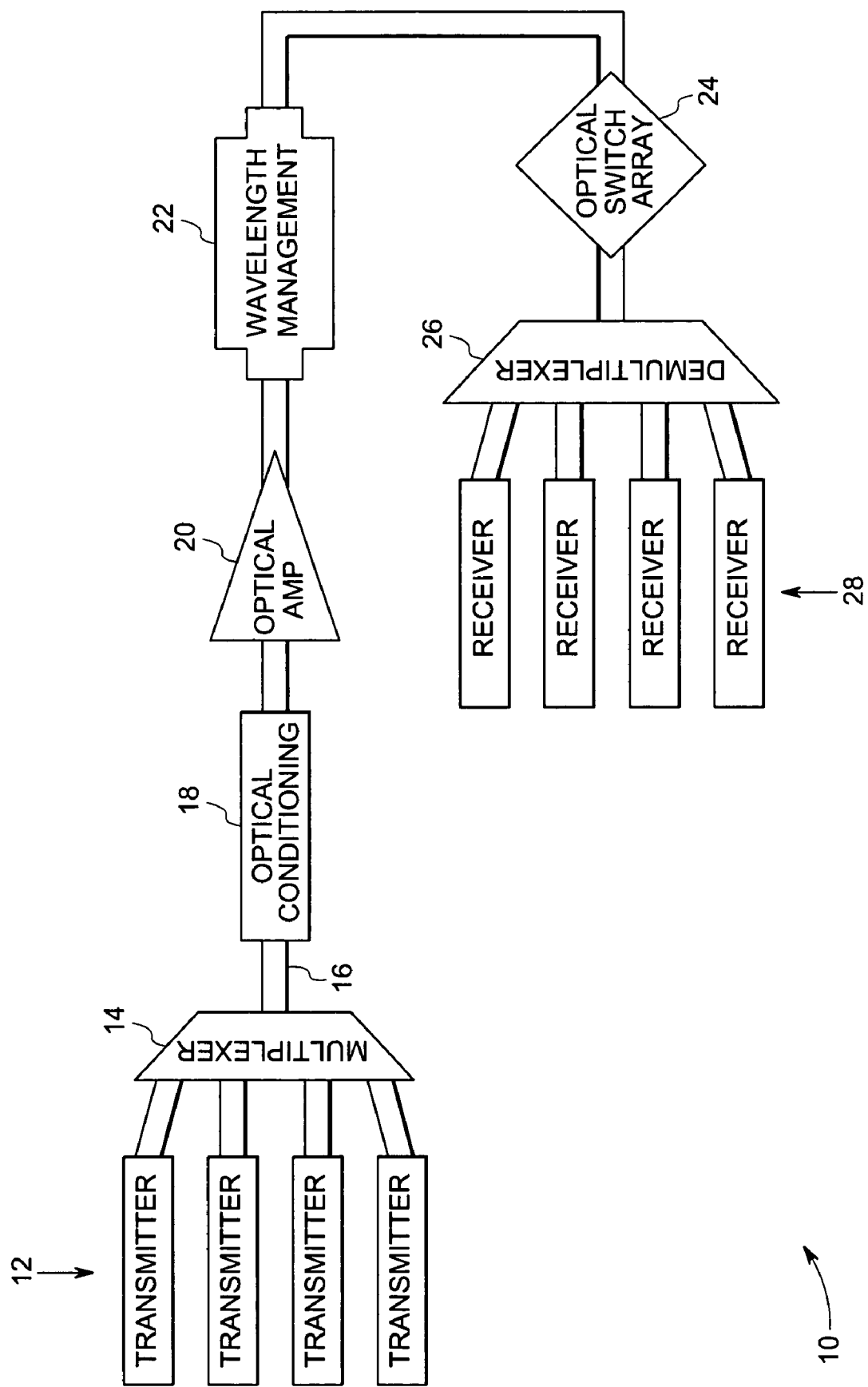
FIG. 1 is a diagrammatic illustration of an all-optical network system.

FIG. 1 is a diagrammatic illustration of an optical network system 10. As illustrated in FIG. 1, the optical network system may include one or more transmitters 12, wherein the transmitter 12 is configured to transmit an optical signal. Further, the optical network system 10 may include a multiplexer 14. As will be appreciated by one skilled in the art, the multiplexer 14 combines multiple signals for transmission over a common medium. For example, in an optical communication system, such as the optical network system 10, a plurality of optical signals transmitted by the transmitters 12 may be combined to form one multiplexed signal to be carried by a common transmission medium, such as an optical fiber.

The multiplexed signal may then be carried down the optical network system 10 via a conduit. In the optical network system 10, the conduit may include an optical fiber 16. As will be appreciated by one skilled in the art, the optical fiber 16 is a transparent thin fiber for transmitting an optical signal. The optical fiber 16 may be employed as a medium for telecommunication because it is flexible and can be bundled to form optical fiber cables. Generally, the optical fibers 16 may be fabricated out of plastic or glass. However, the optical fibers employed in long-distance telecommunication applications are typically made of glass, because of the lower optical absorption of glass. The glass optical fiber also advantageously reduces signal crosstalk between fibers within the cable and allows the routing of the cable with twists and turns.

Further, the multiplexed optical signal may also be processed via an optical conditioning unit 18. Propagating along the optical network 10, the optical signal suffers intensity loss and change of optical properties, such as signal intensity, polarization variation and chromatic dispersion. Due to the performance of the network components, the intensity loss and changes in optical properties are not uniform across signals from various channels. The "optical conditioning" unit 18 may be employed to balance the signals from different channels and compensate for such non-uniformities. The optical conditioning unit 18 may be positioned as illustrated in FIG. 1. However, as may be appreciated, the optical conditioning unit may be positioned at other locations in the optical network system 10.

Recent advances in optical fiber technology have significantly reduced losses in the optical fibers 16 thereby considerably reducing the need for amplifying the optical signals that may be needed for distances over hundreds of kilometers. However, the optical network system 10 may include an optical amplifier 20 that is configured to amplify the optical signal directly, without having to convert the optical signal into an electrical signal, amplifying the signal electrically, and reconverting the signal to an optical signal. As will be appreciated, a number of optical amplifiers 20 may be employed in the optical network system 10 to enhance the optical signals that have been attenuated after propagation over long distances.

As illustrated in FIG. 1, the optical network system 10 may also include a wavelength management unit 22, which may be configured to provide the data necessary to assess the integrity of the optical transport layer in real time that makes pre-emptive optical performance monitoring possible. The data provided by the wavelength management unit 22 may include power, wavelength and optical signal to noise ratio (SNR).

Furthermore, the optical network system 10 may include an optical switch or an optical switch array 24, wherein the optical switch array 24 may be configured to switch the incident optical signal between a plurality of optical fibers. In accordance with embodiments of the present technique, the optical switch array 24 comprises an ultra-fast all-optical switch array. The optical switch array will be described in detail hereinafter.

The optical network system 10 may also include a demultiplexer 26 that may be configured to receive a transmission of several signals over a single line, such as the optical fiber 16, and decode the single line signal into multiple signals and accordingly route the multiple signals to a corresponding receiver. As will be appreciated, the demultiplexer 26 is a logic circuit that takes a single input and sends it to one of several outputs. In addition, the optical network system 10 may also include one or more receivers 28, which may be configured to receive the demultiplexed optical signals.

Figure 2:
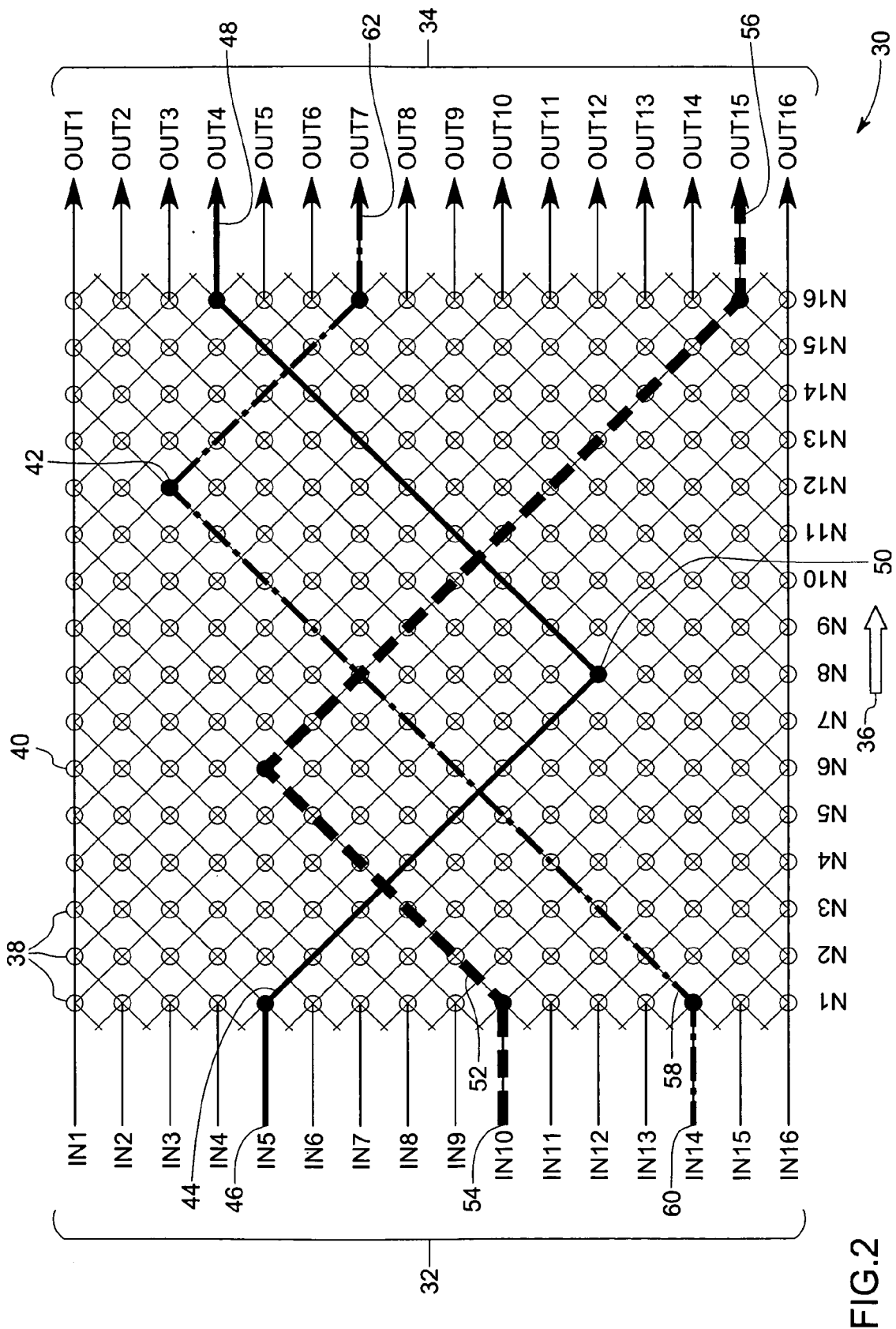
FIG. 2 is an illustration of a signal routing in a 16×16 all-optical switching system.

Referring to FIG. 2, a signal routing of a plurality of optical signals in a 16 by 16 all-optical switching array 30 is illustrated. The array 30 may include a plurality of inputs, such as optical fibers 32 configured to transport incident input optical signals. In addition, the switching array 30 may also include a plurality of outputs, such as optical fibers 34 that may be configured to receive output optical signals, such as transmitted or reflected optical signals from the input optical fibers 32. Reference numeral 36 depicts stages of the switching array 30. As depicted in FIG. 2, a given input optical signal may be routed to any output optical fiber 34.

As exemplified in FIG. 2, a plurality of optical switches 38, also referred to as nodes, is arranged in a 16 by 16 array. Each of the plurality of optical switches 38 may be in either a conducting state or a non-conducting state. An optical switch in a conducting state, such as the optical switch 40, may be configured to transmit an incidental optical signal. Alternatively, an optical switch in a non-conducting state, such as the optical switch 42, may be configured to reflect the incident optical signal to route the optical signal to a predetermined output optical fiber. In a presently contemplated configuration, the conducting state may refer to a transmitting state of the node 38. Further, the non-conducting state may denote a reflecting state of the node 38.

The routing of an input optical signal from an input optical fiber 32 to a predetermined output optical fiber 34 is illustrated in FIG. 2. For example, a first input optical signal 44 may be routed from an input optical fiber, such as input optical fiber IN5 46 in the switching array 30 to a predetermined output optical fiber, such as output optical fiber OUT4 48 in the switching array 30 as illustrated in FIG. 2. The first input optical signal 44 channeled via the input optical fiber IN5 46 is passed through a plurality of optical switches that are in the transmitting or conducting state, which enables the first optical signal 44 to be transmitted through the plurality of optical switches. However, in order to route the first input signal 44 to the predetermined output optical fiber, such as the output optical fiber OUT4 48, an optical switch 50 in the optical switching array 30 may be switched to the reflecting or non-conducting state via a switching device (not shown), such as, but not limited to a laser beam, as described further below with reference to FIG. 3. The first optical signal 44, on encountering the optical switch 50 that has been switched to the reflecting state, is reflected. The reflected first optical signal 44 may be routed to the output optical fiber OUT4 48 via the plurality of nodes that are in the transmitting state.

For purposes of illustration, a routing of a second input optical signal 52 from an input optical fiber IN10 54 to an output optical fiber OUT15 56 is shown in FIG. 2. In a similar fashion, a third optical signal 58 may be routed from an input optical fiber IN14 60 to an output optical fiber OUT7 62.

Figure 3:
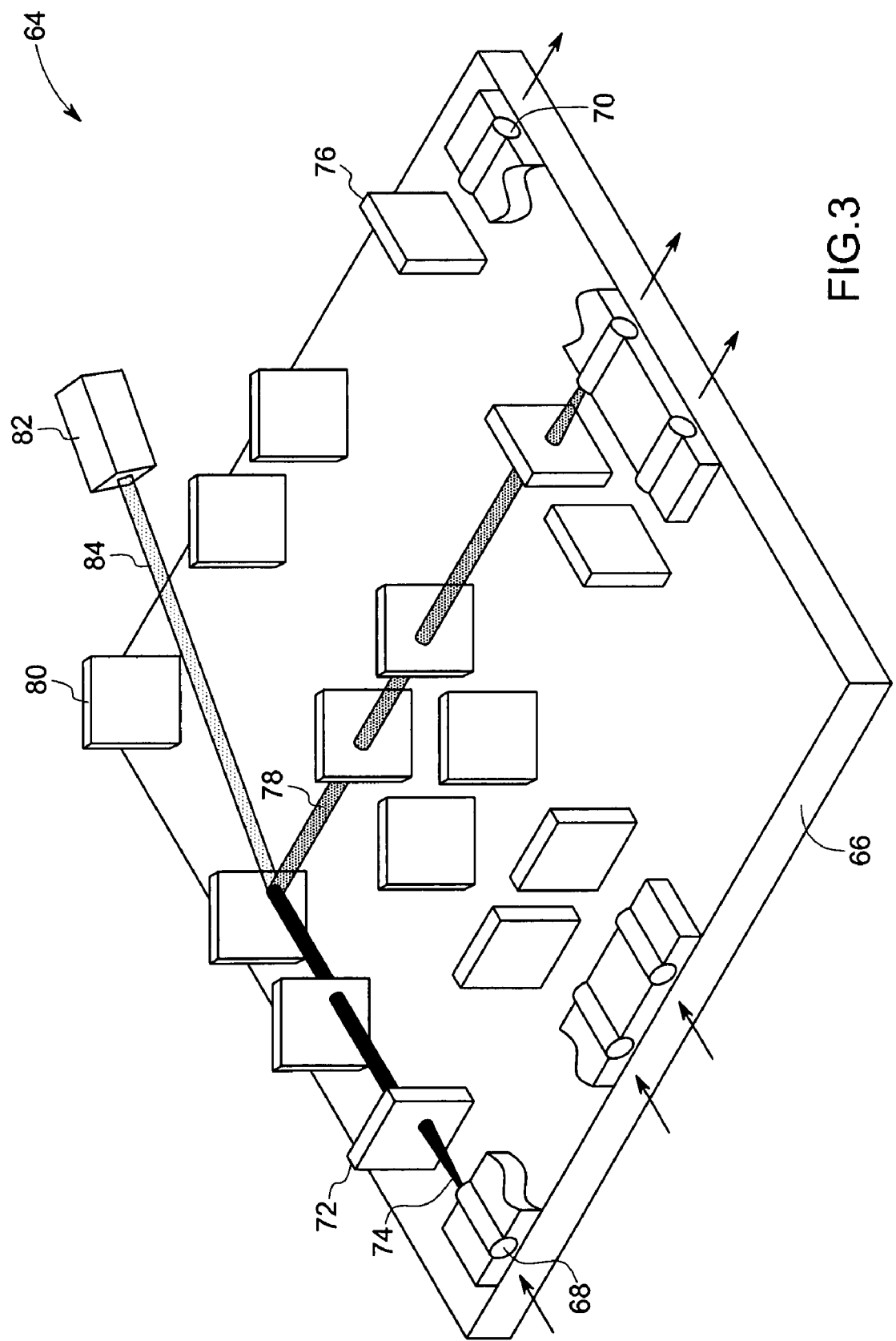
FIG. 3 is a perspective view of an exemplary embodiment of an all-optical switching array, in accordance with aspects of the present technique.

Turning now to FIG. 3, an exemplary embodiment of an all-optical switching array 64, in accordance with aspects of the present technique is illustrated. As depicted in FIG. 3, the all-optical switching array 64 may include a first substrate 66 having a front face and a rear face. The first substrate 66 may be fabricated employing materials such as, but not limited to, silicon dioxide, silicon, or sapphire. Furthermore, a plurality of input optical fibers 68 may be disposed along a first side of the first substrate 66. The input optical fibers 68 may be configured to direct an incident optical signal onto a switching surface. In addition, a plurality of output optical fibers 70 may be disposed along a second side of the first substrate 66, wherein the second side is oriented relative to the first side of the first substrate 66 such that the output optical fibers 70 are configured to receive the reflected optical signal. In a presently contemplated configuration of the switching array 64, the output optical fibers 70 may be disposed such that the second side of the first substrate 66 is approximately perpendicular to the first side of the first substrate 66, as illustrated in FIG. 3.

In one embodiment, a plurality of input focusing lenses 72 may be disposed adjacent to the input optical fibers 68, wherein the input focusing lenses 72 may be configured to collimate the incident optical signal 74 from the input optical fibers 68 onto the switching surface. Similarly, a plurality of output focusing lenses 76 may be disposed adjacent to the output optical fibers 70 such that the output focusing lenses 76 may be configured to direct the reflected optical signal 78 to the output optical fibers 70.

In accordance with an exemplary embodiment of the present technique, a plurality of optical switches 80 may be disposed on the first substrate 66. In one embodiment, each of the plurality of optical switches 80 may correspond to a single pixel. According to aspects of the present technique, the plurality of optical switches 80 may be configured to transmit or reflect the incident optical signal. Each of the plurality of optical switches 80 includes a second substrate coated with a material having properties which allow the material to either transmit or reflect an incident optical signal, depending on the state of the material which may be altered using a control, as described further below with reference to FIG. 4. The coating may be referred to as the switching element. The optical switches 80 may be arranged in a predetermined pattern, such as an array on the first substrate 66, as illustrated in FIG. 3. Further, in the illustrated embodiment of the switching array 64, the optical switches 80 are disposed at approximately a 45 degree angle to the path of the incident optical signal 74. However, other orientations of the optical switches 80 relative to the incident optical signal 74 that satisfy the laws of reflection and refraction may be considered such that each of the optical switches 80 facilitates a desired reflection from the trajectory of an input to the optical switch 80 to an output of the optical switch 80.

In accordance with aspects of the present technique, the all-optical switching array 64 may also include an optical switching device or control configured to optically trigger the plurality of optical switches 80 between a first state and a second state. For instance, the first state may include a transmitting state and the second state may include a reflecting state. In a presently contemplated configuration, an ultra-fast pulsed control beam, such as an ultra-fast laser beam 84 that may be generated by a laser source 82 may be employed as an optical trigger to assist in switching the optical switch 80 between the transmitting state and the reflecting state. In this invention, the "ultra-fast laser beam" may have pulse width from femtoseconds to microseconds. In accordance with one embodiment of the present technique, the laser beam 84 may include an ultra-fast laser beam, wherein the ultra-fast laser beam may include a laser pulse with a width of approximately 100 femtoseconds. The transitioning of the optical switch 80 from the transmitting state to the reflecting state may be facilitated by raising the temperature of the material coating on the second substrate of the optical switch 80 beyond a critical temperature $T_c$ via the ultra-fast laser beam. As will be appreciated by one skilled in the art, the critical temperature of a material is a temperature at which properties of the material may be transitioned to a different state, wherein the transition of states may be a result of atomic structural rearrangement.

Figure 4:
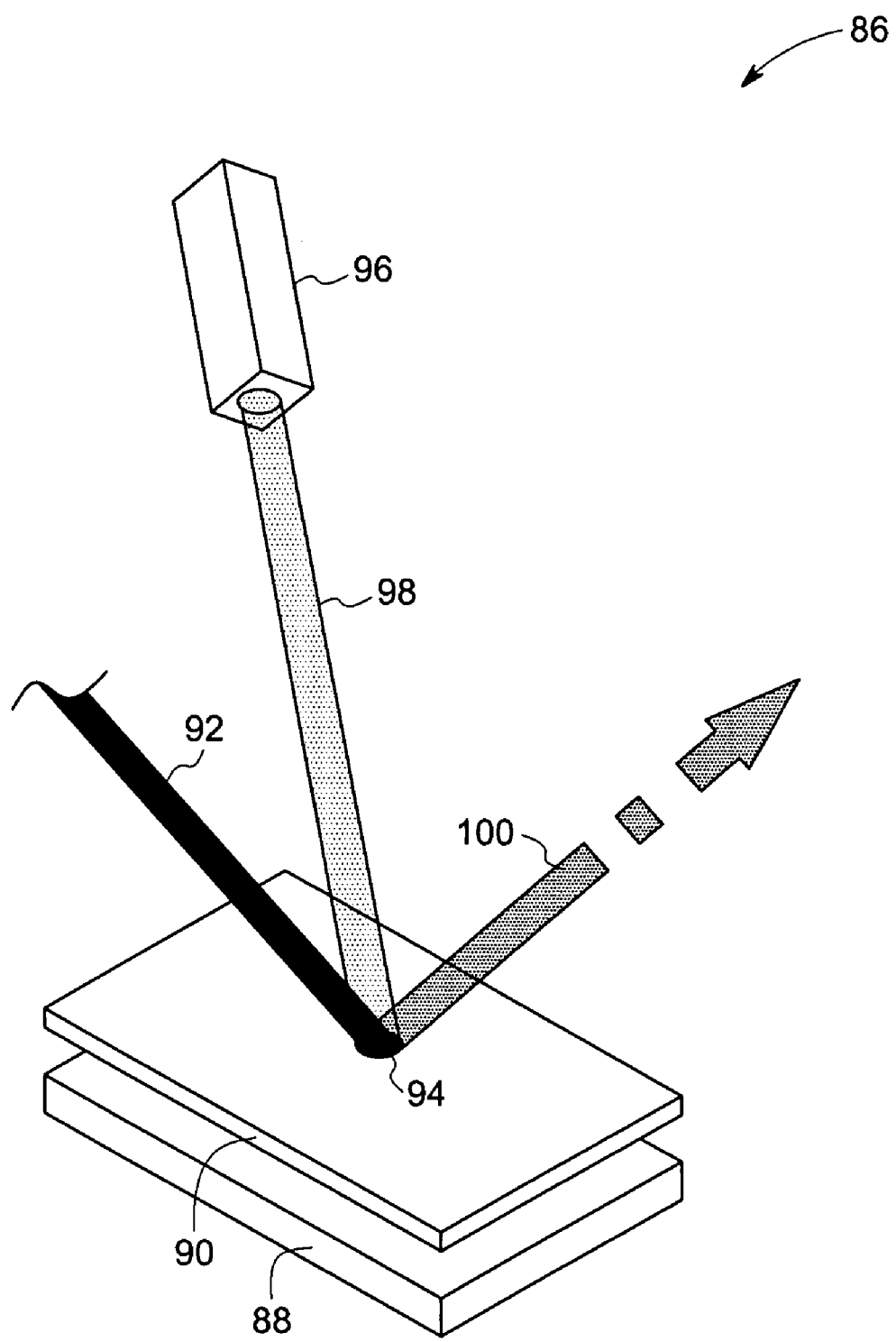
FIG. 4 is a perspective view of an optical switch of the all-optical switching array of FIG. 3, in accordance with aspects of the present technique.

Referring to FIG. 4, an exemplary embodiment 86 of the optical switch 80 in accordance with aspects of the present technique is illustrated. The optical switch 86 may include a substrate 88 having a front face and a rear face, wherein the substrate 88 may be fabricated employing materials such as, but not limited to, silicon dioxide and sapphire. Furthermore, a layer of a material 90 may be disposed on the substrate 88 to facilitate the switching of the optical switch 86 between a transmitting state and a reflecting state.

The layer of material 90 may include materials, such as thermochromic materials, wherein the thermochromic materials exhibit marked changes in reflectance properties with variation of temperature. Examples of thermochromic materials may include transition metal oxides, such as oxides of metals such as vanadium or titanium. In one embodiment of the present technique, a thin film of vanadium dioxide ($VO_2$) may be employed as a switching element. However, in alternate embodiments of the present technique other oxides of vanadium such as vanadium sesquioxide ($V_2O_3$) or vanadium pentoxide ($V_2O_5$) may be employed. Alternatively, some room-temperature semiconductor materials, such as germanium (Ge) may be employed.

As will be appreciated by one skilled in the art, the thermochromic materials exhibit a semiconductor to metal transition near critical temperature $T_c$ as a result of an atomic structural rearrangement. Further, vanadium dioxide is known to exhibit a semiconductor to metal transition (SMT) at a critical temperature $T_c$ of about 68° (degrees) Centigrade (341 degrees Kelvin) that is approximately 40 degrees Centigrade above the room temperature. Above the critical temperature $T_c$, vanadium dioxide has a tetragonal rutile structure and is known to exhibit metallic properties. In this metallic state, vanadium dioxide reflects the incident light signal. Below the critical temperature $T_c$, vanadium dioxide is a narrow gap semiconductor with a monoclinic structure. In this semiconductor state, vanadium dioxide is transparent to the incident light signal. Furthermore, the switching time of vanadium dioxide between the metallic phase and the semiconductor phase may be less than 100 femtoseconds. The hereinabove mentioned properties of vanadium dioxide advantageously facilitate the use of a thin film of vanadium dioxide as a switching device for optical applications. In accordance with embodiments of the present technique, thermochromic materials, such as vanadium dioxide, may be used as the switching device or mechanism for each of the optical switches 80 in the switching array 64.

As will be appreciated, the transition between the transmitting state and the reflecting state exhibited by the thin film of vanadium dioxide is thermodynamically reversible. In other words, at room temperature, the thin film of vanadium dioxide may be configured to transmit the incident optical signal when the thin film of vanadium dioxide is in the semiconductor or transparent state. Alternatively, at a temperature greater than the critical temperature $T_c$, the thin film of vanadium dioxide in the metal or reflecting state may be configured to reflect the incident optical signal.

As best illustrated in FIG. 4, an input optical signal 92 may be incident on the thin film of vanadium dioxide 90 at a point 94. In one embodiment, a thickness of the thin film of vanadium dioxide 90 may be in a range of about 10 nanometers to about 500 nanometers. An example of the vanadium dioxide film thickness is 100 nanometers. Further, the thin film of vanadium dioxide 90 may be capable of transmitting the input optical signal 92 in a range from about 20% to about 100% transmission. The thin film of vanadium dioxide 90 is configured to transmit the incident light 92 through the optical switch 86 while in the semiconductor state or transmitting state. However, the state of the thin film of vanadium dioxide 90 may be switched to the reflecting state by increasing the temperature of the thin film of vanadium dioxide 90 above the critical temperature $T_c$. A laser source 96 may be employed to generate a laser beam, such as an ultra-fast laser beam 98. The ultra-fast laser beam 98 may be employed as an optical trigger to cause the thin film of vanadium dioxide 90 to switch from the semiconductor state to the metal state by augmenting the temperature of the thin film of vanadium dioxide 90 beyond the critical temperature $T_c$. The thin film of vanadium dioxide 90 in the metal or reflecting state may be employed to reflect the incident optical signal 92 to generate a reflected optical signal 100. The reflected optical signal 100 may then be directed to an output optical fiber. Additionally, as will be appreciated by one skilled in the art, approximately 95% of the incident optical signal 92 may be transmitted or reflected by the thin film of vanadium dioxide 90.

Returning to FIG. 3, as previously discussed, a plurality of optical switches such as the exemplary embodiment 86 of the optical switch 80 illustrated in FIG. 4 may be disposed on the first substrate 66 to facilitate the routing of the incident optical signal 74 from the input optical fiber 68 to the output optical fiber 70. The all-optical switching array 64 may be particularly advantageous to switch the incident optical signal 74 from any input optical fiber 68 to any output optical fiber 70, as previously described with reference to FIG. 2.

As described hereinabove, the ultra-fast laser beam 84 may be advantageously employed to control the switching of the state of the plurality of optical switches 80 to facilitate the routing of the incident optical signal 74 from the input optical fiber 68 to the predetermined output optical fiber 70.

In accordance with an exemplary embodiment of the present technique, the ultra-fast laser beam 84 may be configured to scan the all-optical switching array 64 and address each of the plurality of optical switches 80 in the switching array 64 via a galvo device (not shown). As will be appreciated by one skilled in the art, the galvo device may include a pair of steering mirrors, which may be configured to reflect the ultra-fast laser beam 84 in a X-direction and a Y-direction respectively. Each of the plurality of optical switches 80 in the all-optical switching array 64 may correspond to a steering angle of the pair of steering mirrors in the galvo device. As the steering mirrors in the galvo device may be computer controlled, the steering mirrors may be advantageously employed to sequentially or periodically reflect the ultra-fast laser beam 84 onto any desired optical switch 80.

As will be appreciated by one skilled in the art, the process of selectively changing the state of the plurality of optical switches 80 via the ultra-fast laser beam 84 may be referred to as "addressing." Consequently, the ultra-fast laser beam 84 may be employed to route the incident optical signal 74 to a predetermined output optical fiber 70. When the ultra-fast laser beam 84 is pulsed off, the incident optical signal 84 may be transmitted through the optical switch 80 as the thin film of vanadium dioxide is in the transmitting state. Alternatively, when the ultra-fast laser beam 84 is pulsed on, the thin film of vanadium dioxide on the addressed optical switch 80 absorbs laser energy from the ultra-fast laser beam 84. Consequently, the temperature of the thin film of vanadium dioxide is augmented beyond the critical temperature $T_c$. As a result of the change in temperature, the thin film of vanadium dioxide is transitioned to the metal state or the reflecting state and reflects the incident optical signal 74. Furthermore, after the ultra-fast laser beam 84 is pulsed off or moved away from the currently addressed optical switch 80, the thin film of vanadium dioxide on that optical switch 80 returns to the semiconductor state or the transmitting state.

Alternatively, in accordance with another embodiment of the present technique, the ultra-fast laser beam 84 may be split into a plurality of ultra-fast laser beams such that the optical switches 80 may be addressed simultaneously thereby advantageously resulting in reduced scanning time.

According to further aspects of the present technique, the ultra-fast laser beam 84 may be collimated. Further, the collimated ultra-fast laser beam may be channeled through a mask (not shown), wherein the mask may be designed such that the laser beam may be split by the mask such that each of the split beams may be imaged to correspond to an optical switch 80 on the switching array 64. In this exemplary embodiment, the plurality of optical switches 80 may also be switched simultaneously.

Figure 5:
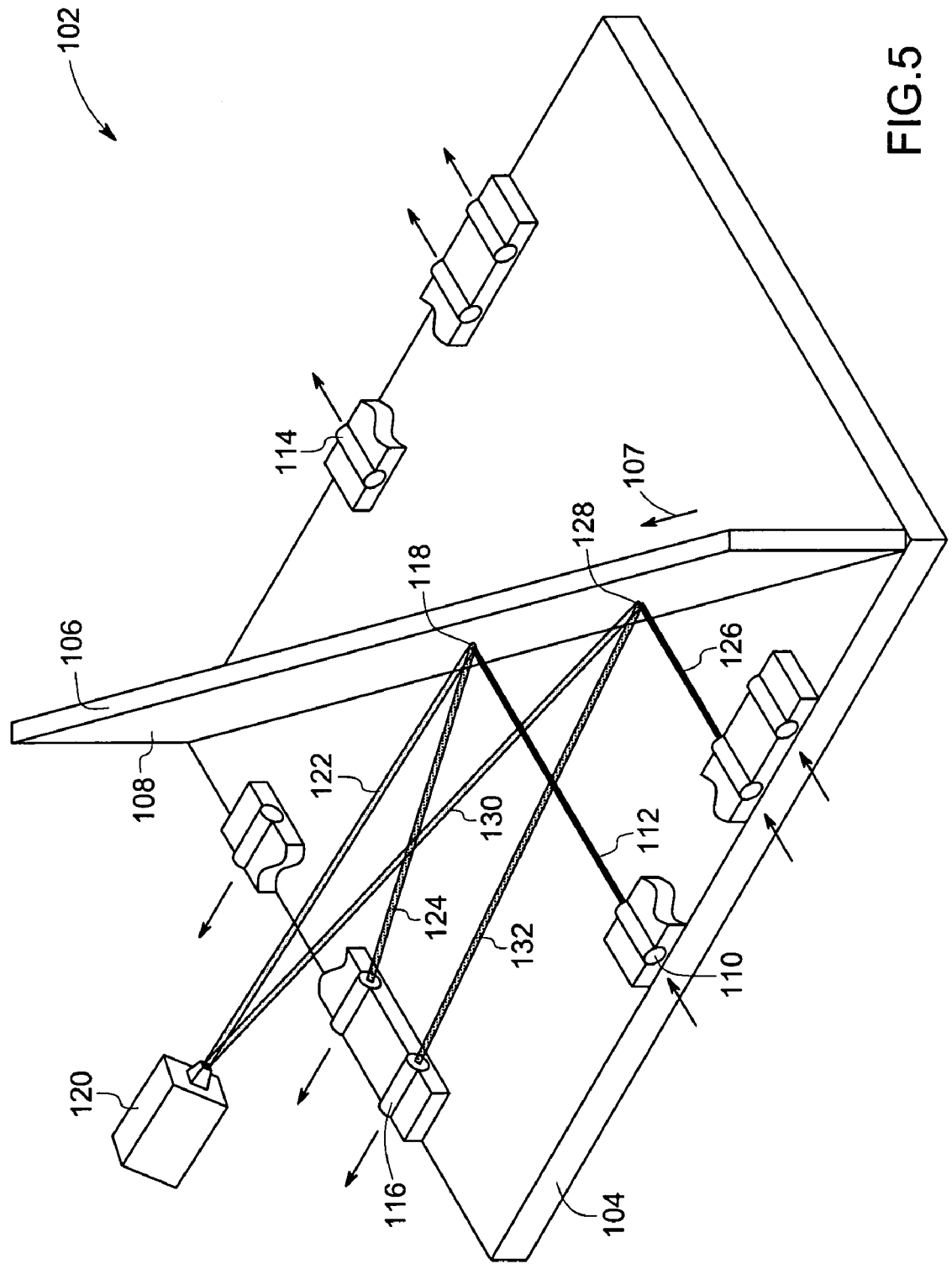
FIG. 5 is a perspective view of an alternate embodiment of an all-optical switching array, in accordance with further aspects of the present technique.

Referring to FIG. 5, an alternate exemplary embodiment 102 of the all-optical switching array 64 of FIG. 3 is illustrated. In a presently contemplated configuration, the all-optical switching array 102 may include a first substrate 104 having a first front face and a first rear face. In addition, a second substrate 106 having a second front face and a second rear face may be disposed on the first substrate 104. In the illustrated embodiment, the second substrate 106 is disposed in a direction represented by reference numeral 107. For example, in the illustrated embodiment of FIG. 5, the second substrate 106 may be disposed substantially perpendicular to the first substrate 104.

In accordance with aspects of the present invention, a thin film of vanadium dioxide 108 may be disposed on the second substrate 106, wherein the thin film of vanadium dioxide 108 may be configured to transmit or reflect an incident optical signal as described hereinabove. In this embodiment, the thin film of vanadium dioxide 108 may be configured to correspond to a plurality of pixels, wherein each pixel may be defined as a predetermined area on the thin film of vanadium dioxide 108. For example, in one embodiment, the size of each pixel may be 10 microns by 10 microns. The plurality of pixels may be configured to operate like the optical switch 80 of FIG. 3.

The all-optical switching array 102 may also include a plurality of input optical fibers 110 disposed along a first side of the first substrate 104 that may be configured to direct a first incident optical signal 112 onto the thin film of vanadium dioxide 108. Furthermore, a first set of output optical fibers 114 may be disposed along a second side of the first substrate 104 behind the second rear face. As depicted in FIG. 5, the first set of output optical fibers 114 may be positioned on the first substrate 104 relative to the input optical fibers 110 such that the optical signal that may be transmitted through the second substrate 106 may be carried to the first set of output optical fibers 114. In addition, a plurality of second output optical fibers 116 may be disposed on the first substrate 104 along a third side of the first substrate 104 oriented relative to the second substrate 106 such that the first incident optical signal 112 reflected at a first region 118 on the thin film of vanadium dioxide 108 is received at a selected output optical fiber 116. The first region 118 may define a single pixel of an image, for instance.

As illustrated in FIG. 5, the first incident optical signal 112 may be directed via the input optical fiber 110 to be incident on the thin film of vanadium dioxide 108 at the first region 118. Furthermore, the all-optical switching array 102 may include a laser source 120 that may generate a laser beam, such as a first ultra-fast laser beam 122. As previously described, the first ultra-fast laser beam 122 may facilitate the switching of the state of the addressed region 118 from a transmitting state to a reflecting state. For example, if the first ultra-fast laser beam 122 is pulsed off, the first optical signal 112 incident on the first region 118 may be transmitted through the second substrate 106 and carried over to the first output optical fiber 114. Alternatively, if the first ultra-fast laser beam 122 is pulsed on, the first incident optical signal 112 may be reflected by the thin film of vanadium dioxide 108 at the region 118. For instance, the reflected optical signal 124 may be reflected to the second output optical fiber 116. Therefore, in accordance with this embodiment, the first incident optical signal 112 may be directed to one of the two sets of output optical fibers 114, 116, depending on the state of the corresponding region 118 on the coated second substrate 106 at which the first incident optical signal 112 impinges the vanadium dioxide 108.

Furthermore, the switching of a second incident optical signal 126 is illustrated in FIG. 5. The second incident optical signal 126 is incident on the thin film of vanadium dioxide 108 at a second region 128. As described with reference to the first incident optical signal 112, a second ultra-fast laser beam 130 may be employed to switch the second incident optical signal 126 from the input optical fiber 110 to one of the first and second sets of output optical fibers 114 and 116. The second reflected optical signal 132 that has been reflected at the second region 128 via the second ultra-fast laser beam 130 is directed to the second set of output optical fibers 116 as illustrated in FIG. 5.

According to further aspects of the present technique, the thin film layer, such as the vanadium dioxide 108, may be patterned such that each region is electrically isolated from adjacent regions in a grid-like pattern. For instance, a grid pattern of vanadium dioxide 108 may be disposed on the second substrate 106 such that each of the regions of vanadium dioxide is completely surrounded by an opaque, non-thermochromic material. In one embodiment, the isolated regions are sized such that each region corresponds to a respective pixel. In this configuration, there is no interference between the neighboring pixels. Furthermore, the heat is dissipated through the second substrate 106 when the ultra-fast laser beam is moved away from the region, thereby minimizing any potential pixel-to-pixel cross talk.

As previously described with reference to FIG. 3, the first ultra-fast laser beam 122 may be configured to serially scan the pixels on the second substrate 106. Alternatively, the plurality of pixels may be addressed simultaneously by employing a plurality of ultra-fast laser beams. For example, for the all-optical switching array 102 that is configured to include 10 input optical fibers or channels, 10 ultra-fast laser beams may be employed to effect the switching of the incident optical signals from the input optical fibers to the output optical fibers. Furthermore, it may be noted that a size of the ultra-fast laser beam may be defined by the size of a region on the second substrate 106. For example, if the region size is 10 microns by 10 microns, the size of the ultra-fast laser beam may be configured to be 10 microns by 10 microns to efficiently effect the switching of the region between the transmitting state and the reflecting state. As previously described, each region may be sized to correspond to a respective pixel.

Furthermore, in accordance with an exemplary embodiment of the present technique, for a second substrate 106 having a uniform layer of vanadium dioxide thereon, a size of a region affected and accordingly, the size and/or number of pixels affected may be reconfigured by varying a size of the ultra-fast laser beam. As will be appreciated by one skilled in the art, the size of the ultra-fast laser beam may be configured by a user. For instance, if the size of an all-optical switch array 102 is 1 millimeter by 1 millimeter, the all-optical switch array 102 may be configured to affect a 100 pixel by 100 pixel area or a 1000 pixel by 1000 pixel area by accordingly varying the size of the control beam.

The all-optical switching arrays 64, 102 described hereinabove facilitate an all-optical network, wherein all transmission and communication remains an optical transmission throughout the transmission. The all-optical switching array 64, 102 may find application in the area of telecommunication, to meet the fast switching needs of the network. Furthermore, the all-optical switching array 64, 102 may be employed in bio-imaging sensors to satisfy the need for fast switching of signals. Also, the all-optical switching array 64, 102 may be employed in data storage applications, wherein the benefits of the fast switching times of the all-optical switching array 64, 102 may be advantageously used to obtain faster read times.

Moreover, due to the elimination of moving parts, the all-optical switching array 64, 102 facilitates faster switching times for use in an optical network, such as an optical telecommunication system. Additionally, the all-optical switching array 64, 102 has the advantage of high capacity and low losses.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. An all-optical switch array for switching the direction of optical signals, the array comprising:
   a first substrate; and
   a second substrate disposed on the first substrate and having a layer of a thermochromic material disposed directly thereon, wherein the layer of thermochromic material comprises a plurality of regions, wherein each of the plurality of regions is configured to operate as an optical switch, wherein each of the plurality of optical switches comprises a first state and a second state and is configured to change the direction of an optical signal, depending on whether the optical switch is in the first state or the second state.

2. The array of claim 1, wherein the first state comprises a transmitting state and the second state comprises a reflecting state.

3. The array of claim 1, wherein each of the plurality of regions comprises a patch of a layer of thermochromic material surrounded by an opaque, non-thermochromic material.

4. The array of claim 3, wherein the layer of thermochromic material comprises a thin film of vanadium oxide.

5. The array of claim 3, wherein a transmission of the layer of thermochromic material is in a range from about 20 percent to about 100 percent transmission.

6. The array of claim 3, wherein a thickness of the layer of thermochromic material is in a range from about 10 nanometers to about 500 nanometers.

7. The array of claim 1, further comprising a switching device configured to optically trigger the plurality of optical switches to switch between the first state and the second state.

8. The array of claim 7, wherein the switching device comprises an ultra-fast pulsed control beam configured to optically trigger the plurality of optical switches to switch between the first state and the second state.

9. The array of claim 8, wherein the switching device comprises a mask, wherein the mask is configured to split the ultra-fast pulsed control beam such that each of the split ultra-fast pulsed control beams is configured to correspond to an optical switch.

10. The array of claim 1, further comprising a plurality of input optical fibers disposed along a first side of the first substrate, wherein the plurality of input optical fibers is configured to direct the optical signal onto at least one of the plurality of optical switches.

11. The array of claim 1, further comprising a plurality of first output optical fibers disposed along a second side of the first substrate behind a second rear face of the second substrate, wherein the second side of the first substrate is oriented in a direction parallel to the first side of the first substrate, and wherein each of the plurality of first output optical fibers is configured to receive the optical signal transmitted through at least one of the plurality of optical switches.

12. The array of claim 1, further comprising a plurality of second output optical fibers disposed along a third side of the first substrate oriented orthogonally relative to the first side of the first substrate, and wherein each of the plurality of first output optical fibers is configured to receive the optical signal reflected via at least one of the plurality of optical switches.

13. An optical network system, the system comprising:
a plurality of transmitters, wherein the transmitters are configured to transmit an optical signal;
a multiplexer unit configured to combine the optical signals;
a conditioning unit configured to balance and compensate non-uniformities among the optical signals;
one or more amplifier units configured to enhance the optical signals;
a wavelength management unit configured to monitor the optical signals;
an all-optical switch array configured to switch a direction of an optical signal from an optical input to an optical output, wherein the all-optical switch array comprises:
a first substrate;
a second substrate disposed on the first substrate and having a layer of a thermochromic material disposed directly thereon, wherein the layer of thermochromic material comprises a plurality of regions, wherein each of the plurality of regions is configured to operate as an optical switch, and wherein each of the plurality of optical switches comprises a first state and a second state and is configured to change the direction of an optical signal, depending on whether the optical switch is in the first state or the second state;
a demultiplexer configured to separate the transmitted optical signals; and
a plurality of receivers configured to receive the transmitted signals.

14. The system of claim 13, wherein the first state comprises a transmitting state and the second state comprises a reflecting state.

15. The system of claim 13, wherein the optical input comprises an input optical fiber and the optical output comprises an output optical fiber.

16. The system of claim 13, wherein the all-optical switch array comprises a first substrate having a first front face and a first rear face, a second substrate having a second front face and a second rear face disposed on the first substrate, wherein the second substrate comprises a plurality of regions disposed on the second substrate, wherein each of the plurality of regions is configured to operate as an optical switch, and wherein each of the plurality of optical switches comprises a first state and a second state and is configured to change the direction of an optical signal, depending on whether the optical switch is in the first state or the second state.

17. The system of claim 16, wherein the first state comprises a transmitting state and the second state comprises a reflective state.

18. The system of claim 16, wherein each of the plurality of regions comprises a patch of a layer of thermochromic material surrounded by an opaque, non-thermochromic material.

19. The system of claim 18, wherein the layer of thermochromic material comprises a thin film of vanadium oxide.

20. The system of claim 13, further comprising a switching device configured to optically trigger the plurality of optical switches to switch between the first state and the second state.

21. The system of claim 20, wherein the switching device comprises an ultra-fast pulsed control beam configured to optically trigger the plurality of optical switches to switch between the first state and the second state.

22. The system of claim 21, wherein the switching device comprises a mask, wherein the mask is configured to split the ultra-fast pulsed control beam such that each of the split ultra-fast pulsed control beams is configured to correspond to an optical switch.

23. The system of claim 13, further comprising a plurality of input optical fibers disposed along a first side of the first substrate, wherein the plurality of input optical fibers is configured to direct the optical signal onto at least one of the plurality of optical switches.

24. The system of claim 13, further comprising a plurality of first output optical fibers disposed along a second side of the first substrate behind the second rear face of the second substrate, wherein the second side of the first substrate is oriented in a direction parallel to the first side of the first substrate, and wherein each of the plurality of first output optical fibers is configured to receive the optical signal transmitted through at least one of the plurality of optical switches.

25. The system of claim 13, further comprising a plurality of second output optical fibers disposed along a third side of the first substrate oriented orthogonally relative to the first side of the first substrate, and wherein each of the plurality of first output optical fibers is configured to receive the optical signal reflected via at least one of the plurality of optical switches.

* * * * *